Dec. 22, 1936. F. WANDER, JR 2,065,254
ROTARY WING FOR AIRPLANES AND THE LIKE
Filed June 26, 1935 3 Sheets-Sheet 3

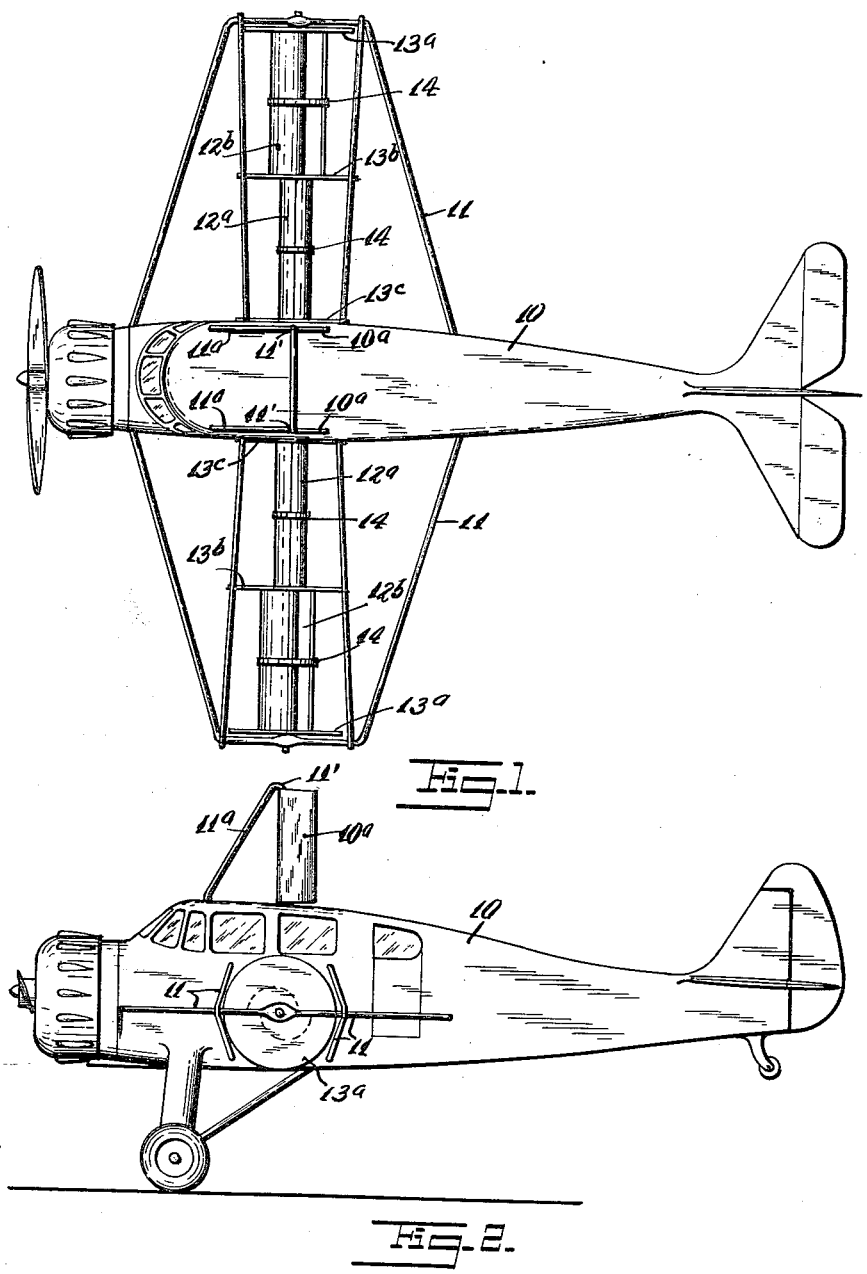

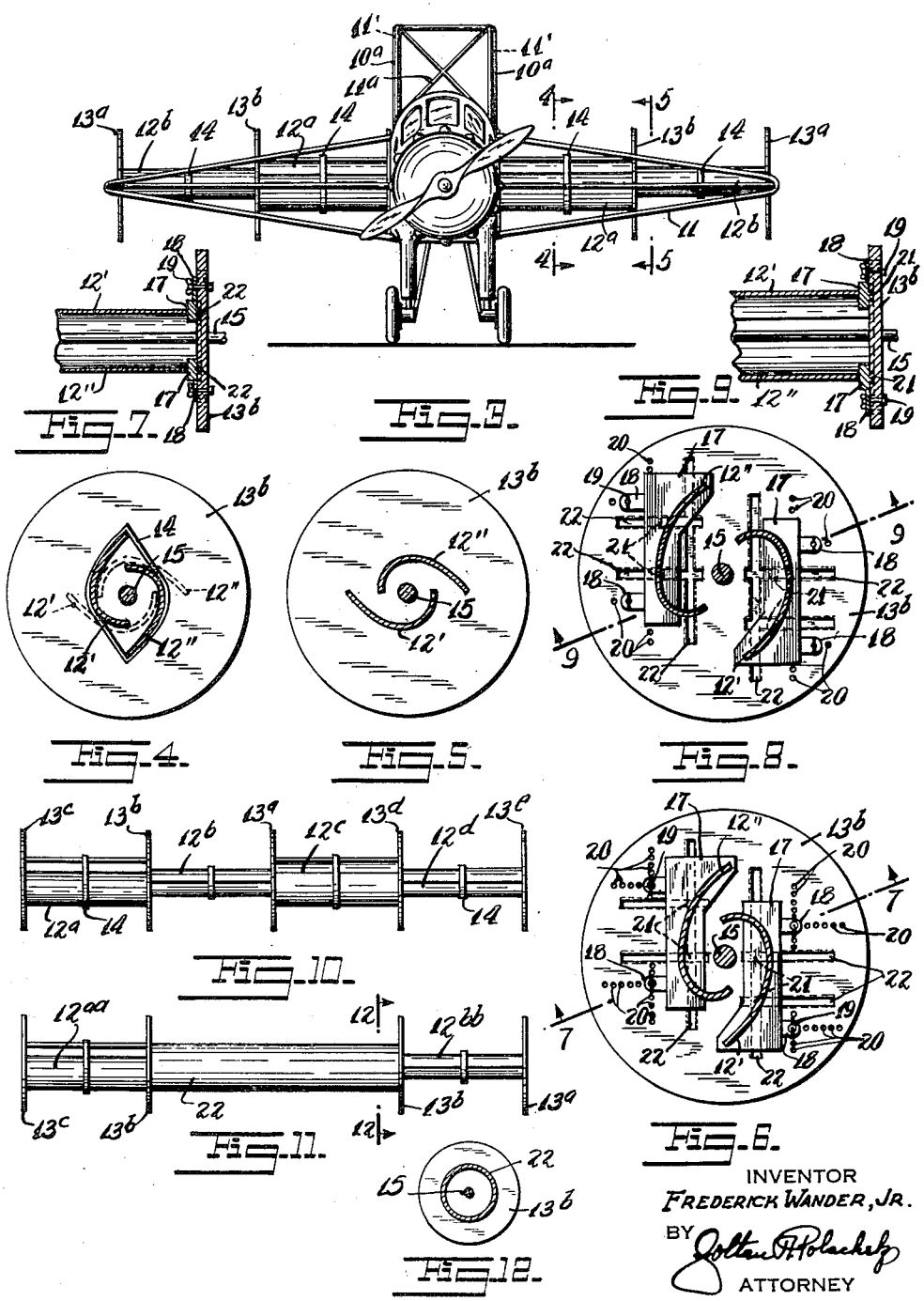

INVENTOR
FREDERIC WANDER, JR.
BY
ATTORNEY

Patented Dec. 22, 1936

2,065,254

UNITED STATES PATENT OFFICE 2,065,254

ROTARY WING FOR AIRPLANES AND THE LIKE

Frederick Wander, Jr., Bronx, N. Y.

Application June 26, 1935, Serial No. 28,392

2 Claims. (Cl. 244—19)

This invention relates to new and useful improvements in rotary wings for airplanes and the like.

The invention has for an object the construction of a rotary wing which is characterized by a plurality of wing portions separated by transverse discs, each of said wing portions consisting of coaxial spiral sections, and the wing portions to be set with the spiral sections thereof staggered.

The advantage of the construction briefly described in the previous paragraph are quite numerous. I have discovered that a rotary wing which must be moved through the air while it rotates or is rotated in order to produce lift, dissipates a large percentage of its lift by reason of the air passing out from the ends thereof. The function of the transverse discs is to prevent this condition and restrain the air to longitudinal motion and thus act to efficiently produce lift.

I have also discovered that rotary wings have a neutral angle which is one at which the forces acting on the rotary wing tend to balance each other. All rotary wings, or rotors, of this type have neutral angles of a greater or lesser number of degrees, depending upon design. These neutral angles will not stop the rotary motion once it has started, but it does tend to slow it up and reduce the efficiency. The dividing of a rotor with the central discs and the setting of the wing portions at staggered angles to each other overcomes this loss of efficiency, not only by speeding up the rotations but also by providing a more constant lifting force.

Furthermore, the invention proposes the provision of a strap or band around the middle of each wing portion to aid the spiral sections in resisting centrifugal force at high speeds.

Still further it is contemplated to provide the rotary wing with a shaft to extend through the axis thereof from end to end to act as bearing axle and for reinforcing and increasing the strength of the structure and providing an element by which the rotary wing may be driven when desired.

Rotary wings, according to this invention, are so efficient that an airplane may be constructed therewith and controlled with the greatest degree of safety. For example, the wings may be driven at a rate faster than their normal free rotation for producing excessive lift, or they may be restrained by brakes to rotate slower than their natural rate for reducing the lift to a minimum. In addition, the entire structure is relatively simple and may be designed to be rugged and reliable.

A rotary wing is similar to a stationary wing in one way, in that it must move through the air to produce lift but it is unlike a stationary wing in other ways, in that the faster it is rotated the more lift it will produce, and it has no burbling point or stalling angle. Generally, when taking off with a plane having stationary wings, it takes a run of several hundred feet to get up to flying speed. Since the lift of a rotor depends not only upon its speed through the air but also its speed of rotation, it may be turned at a higher rate than normal free rotation to obtain the desired lift in half the take-off run. This enables a take-off with a rotary wing plane in a very short run which is always desirable, and sometimes necessary. When coming in for a landing, the rotors may be slowed up below their natural rotating speeds which allows the ship to slip into small fields, and when it is near the ground the rotors may be speeded up so as to gracefully settle the plane on the ground.

Of course, the airplane can land and take off without driving or retarding its rotary wings, which makes the airplane independent of the motor if necessary. In fact, if the motor stalls while in the air a connection may be made with the rotors which will turn the motor over until it starts. Motor failure holds no fears for the rotary wing plane pilot in the air or when taking off as the rotors have no stalling angle when constructed according to this invention. There is no concern about keeping the ship nose down to maintain flying speed or circling at too steep an angle, dropping off on one wing and going into a spin. The rotary wing plane cannot spin nor be flown upside-down. When put into a maneuver it will always return to right side up level flight as soon as the controls are released.

Due to the transverse discs the ship will keep in a straight course so that it may be flown with hands off the controls most of the time. The action of the rotary wings is such that it snubs the bumps in the air, making for a smoother ride in rough weather.

An airplane having rotary wings may easily be banked merely by controlling the speeds of the rotary wings on opposite sides. Thus, one wing may be slowed down while the other wing is increased in speed which will produce a bank independent of the aileron control.

For further comprehension of the invention, and of the objects and advantages thereof, reference will be had to the following description and accompanying drawings, and to the appended claims in which the various novel features of the invention are more particularly set forth.

In the accompanying drawings, forming a material part of this disclosure:—

Fig. 1 is a plan view of an airplane with rotary wings according to this invention.

Fig. 2 is a side elevational view of Fig. 1.

Fig. 3 is a front elevational view of Fig. 1.

Fig. 4 is a transverse sectional view taken on the line 4—4 of Fig. 3.

Fig. 5 is a transverse sectional view taken on the line 5—5 of Fig. 3.

Fig. 6 is a view similar to Fig. 4 but illustrating a modification of the invention.

Fig. 7 is a sectional view taken on the line 7—7 of Fig. 6.

Fig. 8 is another view similar to Fig. 6 but illustrating another position of the wing portions.

Fig. 9 is a sectional view taken on the line 9—9 of Fig. 8.

Fig. 10 is an elevational view of a rotary wing constructed according to another embodiment of the invention.

Fig. 11 is an elevational view of a rotary wing constructed according to a still further embodiment of the invention.

Fig. 12 is a sectional view taken on the line 12—12 of Fig. 11.

Fig. 18 is an elevational view of a ship equipped with rotary wings according to this invention.

Figure 13:
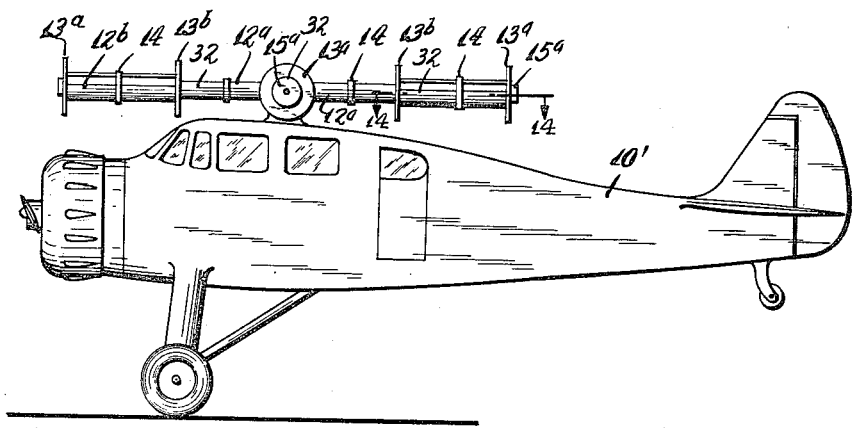
Fig. 13 is a side elevational view of an airplane equipped with a helicopter having rotary wings constructed according to this invention.
Figure 14:
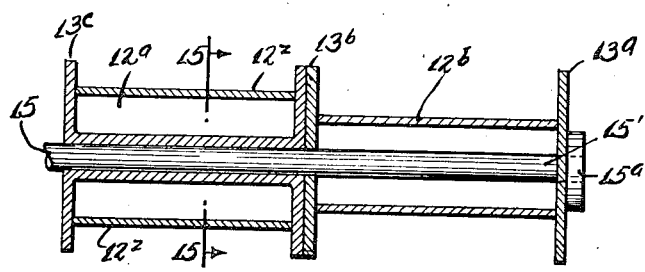
Fig. 14 is a fragmentary enlarged sectional view taken on the line 14—14 of Fig. 13.
Figure 15:
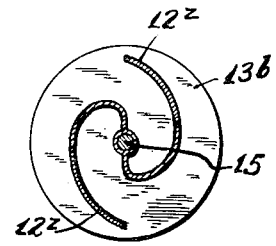
Fig. 15 is a transverse sectional view taken on the line 15—15 of Fig. 14.

In Figs. 1, 2 and 3 an airplane 10 is illustrated with rotary wings on the sides thereof constructed according to this invention. These rotary wings are firmly held by a frame 11. Each rotary wing consists of a plurality of wing portions 12$^a$ and 12$^b$. These wing portions have transverse discs 13$^a$, 13$^b$, and 13$^c$ on the ends thereof. The disc 13$^b$ is common to the wing portions 12$^a$ and 12$^b$. Each of the wing portions consists of spiral sections 12' and 12''. The wing portions 12$^a$ and 12$^b$ are set with the spiral sections 12' and 12'' staggered relative to each other.

The airplane is illustrated with ailerons 10$^a$ for banking. The ailerons are swingably supported on vertical posts 11' and are provided with the usual control connections with the controllers at the pilot's seat. The posts 11' are firmly held in position by a frame 11$^a$.

The discs are of substantially larger diameters than the over all size of the spirals, as clearly illustrated in Figs. 4 and 5. The purpose of this arrangement is to prevent the air from side slipping through the ends of the spiral sections and furthermore, to cut the air so as to direct the plane in true forward flight. Each of the wing portions may be reinforced with strips or bands 14 around the middle sections to aid in resisting centrifugal force at high speeds.

In the form illustrated in Figs. 4 and 5, the spiral sections of each wing portion are shown in the numerical number of two, although 3, 4 or more may be used. They are set at 180° from each other. Furthermore, they terminate a distance from the axis of the wing. A shaft 15 extends through the axis of the wing for the purpose of reinforcing it. Furthermore, the shaft 15 provides an element by which the wing may be driven or slowed down when desired, as previously described. A close inspection of the drawings will reveal that the wing portions are set at 90° from each other. This construction avoids a neutral stalling angle of the wing and increases the efficiency.

In Figs. 6 to 9 another embodiment of the invention has been disclosed wherein the discs are utilized for adjustably holding the spiral sections of the wing portions. More particularly, the ends of the spiral sections are equipped with base plates 17 having lugs 18 through which ring screws 19 are engaged. These wing screws pass through certain of a plurality of openings 20 in the discs, arranged substantially radially of the disc. It will be readily seen that the spiral sections may be rotatively adjusted limited merely to the distances between the openings 20. To insure a sturdy construction the plates 17 are formed with arcuate shaped dove-tailed tongues 21 engaging in receiving grooves 22 formed in the disc. As the spiral sections are adjusted to a larger circumference the peripheral speed of the outside surface of the wing in action is increased and the amount of pressure and vacuum caused by the wing is increased, and so increases the speed of the airplane and the stability of the machine at high speeds.

In Fig. 10 another embodiment of the invention has been disclosed wherein a rotary wing is shown consisting of sections 12$^a$, 12$^b$, 12$^c$ and 12$^d$. The sections 12$^a$ and 12$^c$ are identical as to construction, and rotative location. The sections 12$^b$ and 12$^d$ are also identical as to construction, and rotative location. These wing portions are separated by discs 13$^c$, 13$^b$, 13$^a$, 13$^d$ and 13$^e$. The spiral sections of the wing portions are shown reinforced with the straps or bands 14. The rotor may be composed of any number of alternating sections or the adjacent sections may be set at different angles to each other depending upon the number of sections used. For example, 3 sections may be set 60° apart, 4 sections 45° apart, etc.

In Figs. 11 and 12 another embodiment of the invention has been disclosed in which the rotary wing consists of wing portions 12$^{aa}$ and 12$^{bb}$ separated from each other with a cylindrical portion 22. Discs 13$^c$, 13$^b$, 13$^b$ and 13$^a$ are arranged upon the ends of the wing portions.

In Fig. 13 an airplane 10' is illustrated provided with a helicopter consisting of a plurality of rotary wings 32. Each of these wings consists of wing portions 12$^a$ and 12$^b$ having discs 13$^a$ and 13$^b$ on the ends thereof. Each wing portion consists of coaxial spiral sections which are set staggered from each other. The helicopter may also have any combination of rotors as previously described.

Each wing portion is mounted on the shaft 15' which has a head 15$^a$ at its extended end. The wing portion 12$^a$ is of slightly different construction than the prior described similar wing portions, distinguishing in the fact that the spiral sections 12$^z$ are connected with each other at the axis of the wing and encase the shaft 15. With this arrangement the spiral sections are of S-shape. This form of wing section is shown merely to bring out the fact that various types of wing portions may be used according to this invention.

Figure 16:
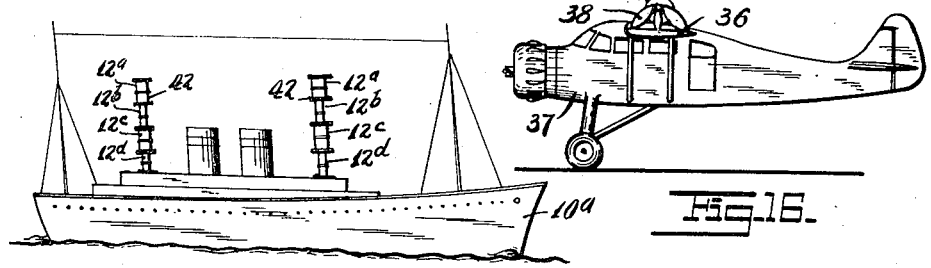
Fig. 16 is a similar view to Fig. 2, but illustrating a modified form of the invention.
Figure 17:
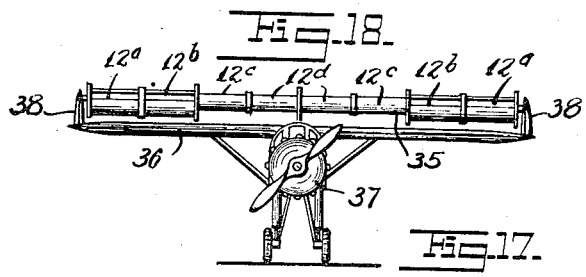
Fig. 17 is a front elevational view of Fig. 16.

In Figs. 16 and 17 the rotor 35 is illustrated above wing section 36 above the fuselage 37 of the airplane, and is supported by suitable stream lined supporting structure 38. In other respects this form of the invention is similar to the previously described and the corresponding parts may be recognized by the same corresponding indicating numerals.

In Fig. 18 a ship 10ª is shown equipped with rotary wings 42 according to this invention. Each of these rotary wings consists of a plurality of wing sections 12ª, 12ᵇ, 12ᶜ and 12ᵈ as previously described with particular reference to Figs. 10 and 11 of this specification.

It is to be understood that instead of single rotors, two or more sets of rotors may be applied to any part of the fuselage parallel to each other and the rotors may be spaced vertically, horizontally, or angularly from each other.

These rotors may be used for any purpose which depends upon the motion of, or motion through the air for the work to be done and can use the rotor in the most suitable of its various forms and combinations.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a rotary wing for airplanes, ships and the like, a plurality of wing portions, transverse discs at the ends of said wing portions, each of said wing portions consisting of axial spiral sections, and means for rotarily adjusting said spiral sections, comprising apertures and grooves in said discs, end plates upon the spiral sections, dove-tailed tongues on the end plates engaging said grooves, and bolts mounted on the end plates and through certain of said apertures for holding the end plates in selected fixed positions.

2. In a rotary wing for airplanes, ships and the like, a plurality of wing portions, transverse discs having apertures and grooves adapted to engage the ends of said wing portions, and each of said wing portions consisting of axial adjustable spiral sections, said adjusting means comprising end plates upon the spiral sections, dove-tailed tongues on the end plates engaging said grooves, and means mounted on the end plates and through certain of said apertures for holding the end plates which in turn holds the spiral sections in certain selected fixed positions.

FREDERICK WANDER, Jr.